US011819163B2

(12) United States Patent
Hohler et al.

(10) Patent No.: US 11,819,163 B2
(45) Date of Patent: Nov. 21, 2023

(54) STAGED FRYER HEATING SYSTEM

(71) Applicant: Henny Penny Corporation, Eaton, OH (US)

(72) Inventors: Melissa M. Hohler, Kettering, OH (US); Kevin R. Romer, Fairfield Township, OH (US)

(73) Assignee: Henny Penny Corporation, Eaton, OH (US)

( * ) Notice: Subject to any disclaimer, the term of this patent is extended or adjusted under 35 U.S.C. 154(b) by 93 days.

(21) Appl. No.: 17/189,891

(22) Filed: Mar. 2, 2021

(65) Prior Publication Data

US 2022/0279972 A1 Sep. 8, 2022

(51) Int. Cl.
 *A47J 37/12* (2006.01)
(52) U.S. Cl.
 CPC ....... *A47J 37/1266* (2013.01); *A47J 37/1257* (2013.01)
(58) Field of Classification Search
 CPC ................ A47J 37/1209; A47J 37/1257; A47J 37/1261; A47J 37/1266
 See application file for complete search history.

(56) References Cited

U.S. PATENT DOCUMENTS

| | | | |
|---|---|---|---|
| 3,919,523 A * | 11/1975 | Wadia | G05D 23/1928 219/494 |
| 4,722,267 A | 2/1988 | Galockin et al. | |
| 4,787,301 A * | 11/1988 | Hoatson | A47J 37/12 99/410 |
| 4,913,038 A | 4/1990 | Burkett et al. | |
| 5,141,760 A | 8/1992 | Davis et al. | |
| 5,186,097 A | 2/1993 | Vaseloff et al. | |
| 5,232,151 A | 8/1993 | Mercer et al. | |
| 5,352,866 A * | 10/1994 | Cartwright | H05B 1/0269 219/442 |

(Continued)

FOREIGN PATENT DOCUMENTS

| | | | | |
|---|---|---|---|---|
| DE | 102015003390 A1 * | 6/2016 | | A47J 37/1219 |
| WO | WO-2019108909 A1 * | 6/2019 | | A47J 37/12 |

OTHER PUBLICATIONS

Translation of DE-102015003390-A1 (Year: 2016).*

(Continued)

*Primary Examiner* — Erin Mcgrath
(74) *Attorney, Agent, or Firm* — Wood Herron & Evans LLP

(57) ABSTRACT

Systems, methods, and computer program products for controlling a heating system in a fryer. At startup, a setpoint temperature for a cooking medium is set to a melt temperature. While in melt mode, each of a plurality of heating elements each located in a different region of a fry pot is sequentially activated to control an amount of heat provided to the cooking medium. Once the cooking medium has reached the melt temperature, the setpoint temperature is increased to a target cooking temperature. While in cooking mode, if an order to cook a food product is not received within a predetermined time period, the setpoint temperature is set to an idle temperature which is below the target setpoint temperature and above the melt temperature. The target cooking temperature is adjusted using a set of setpoint bias temperatures that is selected based on a cooking load.

13 Claims, 7 Drawing Sheets

(56) References Cited

U.S. PATENT DOCUMENTS

| | | | |
|---|---|---|---|
| 5,398,597 | A | 3/1995 | Jones et al. |
| 5,973,297 | A | 10/1999 | Winter et al. |
| 6,883,419 | B2 | 4/2005 | Suzuki |
| 7,100,497 | B2 | 9/2006 | Shandross |
| 8,551,331 | B2 | 10/2013 | Burkett et al. |
| 10,641,274 | B2 | 5/2020 | Chien et al. |
| 2003/0015518 | A1* | 1/2003 | Baker .................... F24C 7/087 219/486 |
| 2008/0110346 | A1 | 5/2008 | Allesina |
| 2008/0121578 | A1 | 5/2008 | Burkett et al. |
| 2009/0084273 | A1 | 4/2009 | Lackman et al. |
| 2014/0302211 | A1 | 10/2014 | Rose et al. |
| 2018/0333005 | A1 | 11/2018 | Fritz et al. |
| 2019/0032958 | A1 | 1/2019 | Ohse et al. |
| 2019/0327795 | A1* | 10/2019 | Hannah ................... F24C 7/088 |
| 2020/0000264 | A1 | 1/2020 | Lingenheil et al. |
| 2020/0060475 | A1 | 2/2020 | Hohler et al. |
| 2020/0305646 | A1 | 10/2020 | Hohler et al. |

OTHER PUBLICATIONS

European Patent Office, Partial European Search Report issued in EP 22159724.8-1004, dated Jul. 19, 2022 (14 pages).
European Patent Office, Extended European Search Report issued in EP 23174588.6-1004, dated Sep. 15, 2023 (6 pages).

* cited by examiner

STAGED FRYER HEATING SYSTEM

TECHNICAL FIELD

The invention generally relates to fryers, and in particular, to systems, methods, and computer program products for controlling a heating system in a fryer.

BACKGROUND

Oil-based frying is commonly used as a cooking method for a wide range of foods, such as poultry, fish, and potato products. Commercial fryers include one or more fry pots that are filled with a cooking medium such as oil or solid fats. Heat is provided to the cooking medium using a heater, which typically includes an electrical heating element submerged in the cooking medium or a gas burner thermally coupled to the cooking medium though the walls of the fry pot. When the cooking medium reaches a preset cooking temperature, food products are placed into the cooking medium for a predetermined amount of time during which the food products are cooked by heat from the cooking medium. To facilitate insertion and removal of the food product, the food product is typically placed inside a container, such as a wire basket, and the container lowered into the cooking medium for the predetermined amount of time.

Fryers typically include an electronic controller that is configured to maintain the temperature of the cooking medium at a preset level and generally operate the fryer. When the temperature of the cooking medium drops below a setpoint temperature, the controller activates a heater to raise the temperature of the cooking medium back to the setpoint temperature. When the setpoint temperature is achieved, the heater is deactivated. The goal of the controller is to activate the heater in a manner that keeps the temperature of the cooking medium relatively consistent and near the setpoint temperature. However, controllers are often subject to overshoot and other errors that cause the cooking medium to become too hot or too cold.

Thus, there is a need for improved systems, methods, and computer program products which enable improved temperature control in fryers.

SUMMARY

In an embodiment of the invention, a fryer is provided. The fryer includes a fry pot configured to receive a cooking medium, and a controller. The controller is configured to control an amount of heat provided to the cooking medium based on a setpoint temperature, which is set to a target cooking temperature during a cook cycle. In response to the cook cycle ending, the controller starts an idle timer. If an order to cook is received prior to expiration of the idle timer, the controller resets the idle timer. If the order to cook is not received prior to expiration of the idle timer, the controller sets the setpoint temperature to an idle temperature that is less than the target cooking temperature.

In an aspect of the invention, the controller is further configured to, in response to the fryer being powered on, set the setpoint temperature to a melt temperature that is less than the idle temperature, and in response to a sensed temperature of the cooking medium reaching the melt temperature, set the setpoint temperature to the target cooking temperature.

In another aspect of the invention, the fryer further includes a plurality of heating elements, and the controller is further configured to, while the setpoint temperature is set to the melt temperature, select a heating element of the plurality of heating elements based on an activation sequence, and activate the selected heating element for an activation time. In response to the activation time expiring, the controller deactivates the selected heating element, selects a next heating element in the activation sequence, and repeats activation, deactivation, and selection of the next heating element in the activation sequence while the setpoint temperature is set to the melt temperature.

In another aspect of the invention, the controller is further configured to, in response to deactivating the selected heating element, wait for a deactivation time before activating the next heating element.

In another aspect of the invention, the fry pot includes a plurality of regions, each heating element of the plurality of heating elements is located one of the plurality of regions, and the activation sequence is configured so that consecutively activated heating elements are not in the same region.

In another aspect of the invention, the fryer further includes a heating element and a power switch including a first contactor and a second contactor connected in series. The power switch is configured to selectively couple the heating element to a power source in response to one or more signals from the controller, and the controller is further configured to, in response to receiving a first command to activate the heating element, determine a state of a contactor flag having a first state and a second state. In response to the contactor flag being in the first state, the controller activates the first contactor, and in response to receiving a second command to deactivate the heating element, the controller deactivates the second contactor and changes the state of the contactor flag to the second state. In response to the contactor flag being in the second state, the controller activates the second contactor, and in response to receiving the second command to deactivate the heating element, deactivates the first contactor and changes the state of the contactor flag to the first state.

In another aspect of the invention, the fryer further includes a plurality of heating elements each configured to provide heat to the cooking medium in response to being activated by the controller, and the controller is further configured to determine a cooking load and select a set of setpoint bias temperatures based on the cooking load, each setpoint bias temperature defining a threshold temperature below the target cooking temperature. In response to a sensed temperature of the cooking medium being below a first threshold temperature but above a second threshold temperature, the controller activates a first heating element of the plurality of heating elements, and in response to the sensed temperature of the cooking medium being below the second threshold temperature, the controller activates a second heating element of the plurality of heating elements.

In another aspect of the invention, the fry pot includes a plurality of regions, the fryer further includes a plurality of temperature sensors each configured to provide one or more signals to the controller indicative of a temperature of the cooking medium in a region of the plurality of regions, and the controller is further configured to, each time a heating element is to be activated, determine the region of the fry pot having a lowest temperature of the cooking medium, and select the heating element in the region having the lowest temperature of the cooking medium for activation.

In another aspect of the invention, the plurality of regions of the fry pot includes a first region into which a first basket is lowered and a second region into which a second basket is lowered, and the cooking load is one of a first cooking load in which the first basket and the second basket are each full of a food product, a second cooking load in which one of the first basket and the second basket is partially full of the food product and the other of the first basket and the second basket is full of the food product, and a third cooking load in which the first basket and the second basket are each partially full of the food product.

In another aspect of the invention, the number of setpoint bias temperatures in the set of setpoint bias temperatures is equal to the number of heating elements in the plurality of heating elements.

In another aspect of the invention, the controller is further configured to, in response to the sensed temperature of the cooking medium being above one of the first threshold temperature and the second threshold temperature, deactivate any heating elements of the plurality of heating elements which were previously activated in response to the sensed temperature being below the one of the first threshold temperature and the second threshold temperature.

In another embodiment of the invention, a method of controlling the fryer is presented. The method includes controlling the amount of heat provided to the cooking medium based on the setpoint temperature, the setpoint temperature being set to the target cooking temperature during the cook cycle. In response to the cook cycle ending, the method starts the idle timer. If an order to cook is received prior to expiration of the idle timer, the method resets the idle timer, and if the order to cook is not received prior to expiration of the idle timer, the method sets the setpoint temperature to the idle temperature that is less than the target cooking temperature.

In an aspect of the invention, the method further includes, in response to the fryer being powered on, setting the setpoint temperature to the melt temperature that is less than the idle temperature, and in response to the sensed temperature of the cooking medium reaching the melt temperature, setting the setpoint temperature to the target cooking temperature.

In another aspect of the invention, the method further includes, while the setpoint temperature is set to the melt temperature, selecting the heating element of the plurality of heating elements based on the activation sequence, and activating the selected heating element for the activation time. In response to the activation time expiring, the method deactivates the selected heating element, selects the next heating element in the activation sequence, and repeats activation, deactivation, and selection of the next heating element in the activation sequence while the setpoint temperature is set to the melt temperature.

In another aspect of the invention, the method further includes, in response to deactivating the selected heating element, waiting for the deactivation time before activating the next heating element.

In another aspect of the invention, each heating element of the plurality of heating elements is located one of the plurality of regions of the fry pot, and the activation sequence is configured so that consecutively activated heating elements are not in the same region.

In another aspect of the invention, the fryer includes the heating element and the power switch including the first contactor and the second contactor connected in series, the power switch is configured to selectively couple the heating element to the power source, and the method further includes, in response to receiving the first command to activate the heating element, determining the state of a contactor flag having the first state and the second state. In response to the contactor flag being in the first state, the method activates the first contactor of the power switch, and in response to receiving a second command to deactivate the heating element, deactivates the second contactor and changes the state of the contactor flag to the second state. In response to the contactor flag being in the second state, the method activates the second contactor, and in response to receiving the second command to deactivate the heating element, deactivates the first contactor and changes the state of the contactor flag to the first state.

In another aspect of the invention, the fryer includes the plurality of heating elements each configured to provide heat to the cooking medium in response to being activated by the controller, and the method further includes determining the cooking load and selecting the set of setpoint bias temperatures based on the cooking load, each setpoint bias temperature defining the threshold temperature below the target cooking temperature. In response to the sensed temperature of the cooking medium being below the first threshold temperature but above the second threshold temperature, the method activates the first heating element of the plurality of heating elements, and in response to the sensed temperature of the cooking medium being below the second threshold temperature, the method activates the second heating element of the plurality of heating elements.

In another aspect of the invention, the fryer includes the fry pot having the plurality of regions, and the method further includes, each time a heating element is to be activated, determining the region of the fry pot having the lowest temperature of the cooking medium, and selecting the heating element in the region having the lowest temperature of the cooking medium for activation.

In another embodiment of the invention, a computer program product for controlling the fryer is provided. The computer program product includes a non-transitory computer-readable storage medium, and program code stored on the non-transitory computer-readable storage medium that, when executed by one or more processors, causes the one or more processors to control the amount of heat provided to the cooking medium based on the setpoint temperature, the setpoint temperature being set to the target cooking temperature during the cook cycle. In response to the cook cycle ending, the program code causes the one or more processors to start the idle timer, if the order to cook is received prior to expiration of the idle timer, reset the idle timer, and if the order to cook is not received prior to expiration of the idle timer, set the setpoint temperature to the idle temperature that is less than the target cooking temperature.

In another embodiment of the invention, another fryer is provided. The fryer includes the fry pot configured to receive the cooking medium, the plurality of heating elements each configured to provide heat to the cooking medium, and the controller. The controller is configured to control the amount of heat provided to the cooking medium by selectively activating the heating elements based on the setpoint temperature, the setpoint temperature being set to the target cooking temperature. The controller is further configured to determine the cooking load and select the set of setpoint bias temperatures based on the cooking load, each setpoint bias temperature defining the threshold temperature below the target cooking temperature. In response to the sensed temperature of the cooking medium being below the first threshold temperature but above the second threshold temperature, the controller activates the first heating element of the plurality of heating elements, and in response to the sensed temperature of the cooking medium being below the second threshold temperature, the controller activates the second heating element of the plurality of heating elements.

The above summary presents a simplified overview of some embodiments of the invention to provide a basic understanding of certain aspects of the invention discussed herein. The summary is not intended to provide an extensive overview of the invention, nor is it intended to identify any key or critical elements, or delineate the scope of the invention. The sole purpose of the summary is merely to present some concepts in a simplified form as an introduction to the detailed description presented below.

BRIEF DESCRIPTION OF THE DRAWINGS

The accompanying drawings, which are incorporated in and constitute a part of this specification, illustrate various embodiments of the invention and, together with the general description of the invention given above, and the detailed description of the embodiments given below, serve to explain the embodiments of the invention.

It should be understood that the appended drawings are not necessarily to scale, and may present a somewhat simplified representation of various features illustrative of the basic principles of the invention. The specific design features of the sequence of operations disclosed herein, including, for example, specific dimensions, orientations, locations, and shapes of various illustrated components, may be determined in part by the particular intended application and use environment. Certain features of the illustrated embodiments may have been enlarged or distorted relative to others to facilitate visualization and a clear understanding. In particular, thin features may be thickened, for example, for clarity or illustration.

DETAILED DESCRIPTION

Fryers in accordance with embodiments of the invention may include a plurality of operational modes, and a heating system having a plurality of individually controlled heating elements. The modes may include a melt mode, a warm idle mode, and a cooking mode. The heating elements may be controlled using a cold-region selection feature that determines which heating elements should be activated to maintain a setpoint temperature $T_{SP}$ based on the relative temperature of the cooking medium in different regions of the fry pot. A staging process may also be implemented that anticipates an impending cook cycle in order to provide better management of temperature drops and overshoots of the cooking medium based on an expected cooking load. To this end, the staging process may activate one or more heating elements to compensate for the expected cooking load. This may reduce temperature drop and shorten temperature recovery periods as compared to conventional fryers, thereby providing more consistent cooking and improved product quality. This cooking load anticipation feature may be particularly advantageous when used in 'batch mode' where the temperature of the cooking medium may have an opportunity to cool between cook cycles.

Figure 1:
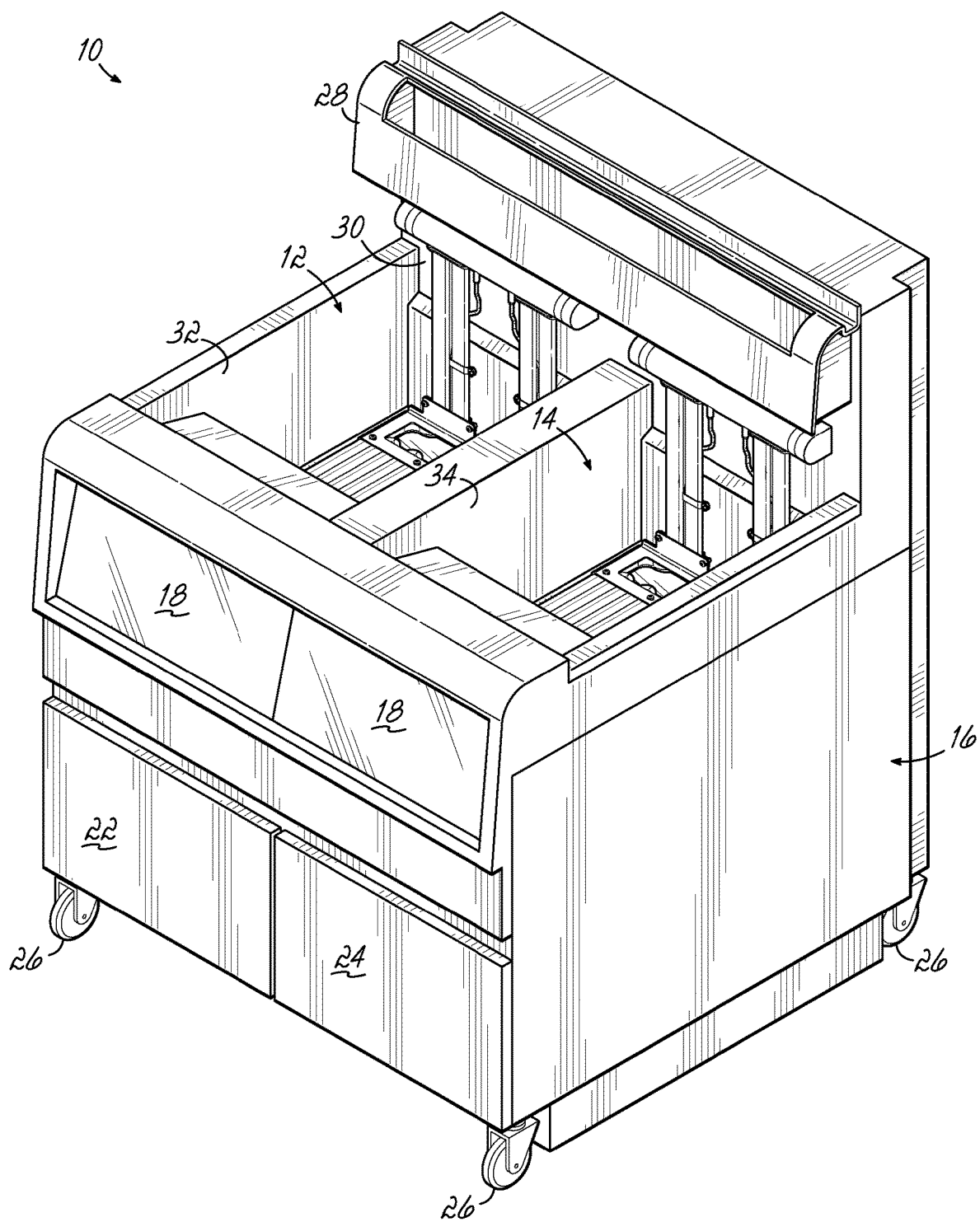
FIG. 1 is a perspective view of an exemplary fryer according to an embodiment of the invention.

FIG. 1 depicts an exemplary fryer 10 in accordance with an embodiment of the invention. The fryer 10 includes a plurality of fry pots 12, 14, a cabinet 16, one or more control panels 18, one or more access panels 22, 24, wheels 26, a basket hanger 28, and a backsplash 30. Each of the fry pots 12, 14, cabinet 16, access panels 22, 24, basket hanger 28, and backsplash 30 may be constructed from stainless steel, mild steel, or some other suitable material. Each fry pot 12, 14 also includes a respective top opening 32, 34 though which a food product can be placed into the fryer 10.

A food product may be placed into the fry pots 12, 14, for example, by lowering a basket containing the food product into the fry pot 12, 14 through the top opening 32, 34. At completion of the cook cycle, the basket may be removed from the fry pot 12, 14 and hung from the basket hanger 28 to allow excess cooking medium to drain back into the fry pot 12, 14. The control panels 18 may provide a human-machine interface for operating the fryer 10. To this end, the control panels 18 may receive commands from an operator of the fryer 10, and display information regarding a status of the fryer 10 to the operator. The access panels 22, 24 may be used to access to the interior of cabinet 16 and to service the components of the fryer 10.

Figure 2:
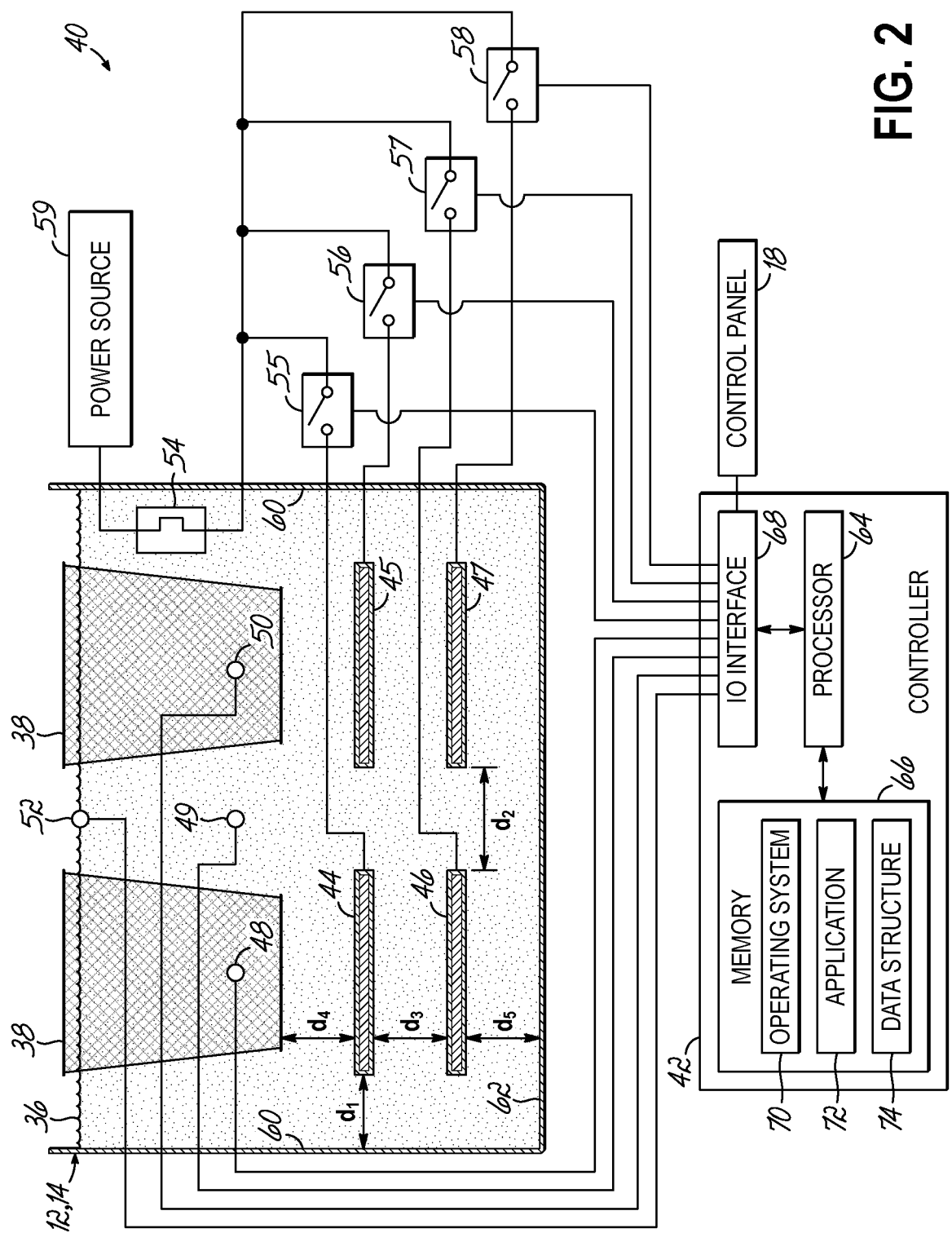
FIG. 2 is a cross-sectional view of one vat of the fryer of FIG. 1 depicting a fry pot, heating elements, a controller, and power switches.

FIG. 2 depicts a diagrammatic cross-sectional view of an exemplary fry pot 12, 14 in accordance with an embodiment of the invention. The fry pot 12, 14 may be configured to receive a cooking medium 36 and one or more (e.g., two) baskets 38. Suitable cooking mediums 36 may include plant-based fats, animal-based fats, and/or synthetic (e.g., hydrogenated) fats. A heating system 40 configured to heat the cooking medium 36 may include a controller 42, one or more (e.g., four) heating elements 44-47, one or more (e.g., three) temperature sensors 48-50, a level sensor 52, a thermal cutoff switch 54, and one or more (e.g., four) power switches 55-58. The power switches 55-58 may be used to selectively couple the heating elements 44-47 to a power source 59 via the thermal cutoff switch 54 in response to power control signals (e.g., pulse-width modulated signals) from the controller 42. The power switches 55-58 may thereby enable the controller 42 to individually control the amount of power provided to each heating element 44-47. Each power switch 55-58 may include one or more contactors, thyristors, triacs, or any other suitable high power switching devices designed to provide power to high-current loads.

The heating elements 44-47 may be located in different positions so that each element is the primary provider of heat to a different region of the cooking medium 36. To this end, each heating element 44-47 may be offset vertically, horizontally, or both vertically and horizontally from the other heating elements. Exemplary regions may include a top-left heated region in which a top-left heating element 44 is located, a top-right heated region in which a top-right heating element 45 is located, a bottom-left heated region in which a bottom-left heating element 46 is located, and a bottom-right heated region in which a bottom-right heating element 47 is located. In an exemplary configuration of the heating elements 44-47, each heating element 44-47 may be located one or more of a distance $d_1$ from a side surface 60 of fry pot 12, 14, a distance $d_2$ from a laterally adjacent heating element 44-47, a distance $d_3$ from a vertically adjacent heating element 44-47, a distance $d_4$ from a bottom portion of the basket 38 when the basket 38 is fully lowered into the fry pot 12, 14, and a distance $d_5$ from a bottom surface 62 of fry pot 12, 14. The distances $d_1$-$d_5$ may be selected to provide optimal heating of the cooking medium 36, e.g., by minimizing thermal gradients within the cooking medium 36 when the heating elements 44-47 are activated.

The temperature sensors 48-50 may include a left temperature sensor 48 configured to detect the temperature of the cooking medium 36 in a region occupied by or proximate to one of the baskets 38, a middle temperature sensor 49 configured to detect the temperature of the cooking medium in a region between the baskets 38, and a right temperature sensor 50 configured to detect the temperature of the cooking medium 36 in a region occupied by or proximate to the other of the baskets 38.

The controller 42 may be operatively coupled to the control panel 18, temperature sensors 48-50, level sensor 52, and power switches 55-58. The controller 42 may be configured to provide operating information to, and receive input from, an operator of the fryer 10 via the control panels 18. The temperature sensors 48-50 may be configured to provide signals to the controller 42 indicative of the temperature of the cooking medium 36 in the region occupied by the sensor. These signals may be used by the controller 42 to regulate the temperature of the cooking medium 36, e.g., by comparing the sensed temperature $T_{SENSE}$ with a setpoint temperature $T_{SP}$, and to display the temperature of the cooking medium 36 on the control panel 18.

The controller 42 may include a processor 64, a memory 66 that stores program code which is executed by the processor 64, and an input/output (I/O) interface 68 that operatively couples the processor to other components of the fryer 10, such as the control panel 18, power switches 55-58, temperature sensors 48-50, and level sensor 56. The control panels 18 may be operatively coupled to the controller 42 to provide a human-machine interface (HMI) that allows the operator to interact with the controller 42. The control panels 18 may include a display (e.g., a touchscreen) having suitable audio and visual indicators capable of providing information to the operator. The control panels 18 may also include input devices and controls capable of accepting commands or input from the operator and transmitting the entered input to the controller 42, such as the aforementioned touchscreen. In this way, the control panels 18 may enable manual initiation or selection of system functions, for example, during set-up of the fryer 10.

The processor 64 may operate under the control of an operating system 70 that resides in memory 66. The operating system 70 may manage controller resources so that computer program code embodied as one or more computer software applications, such as an application 72 residing in memory 66, can have instructions executed by the processor 64. In an alternative embodiment, the processor 64 may execute the application 72 directly, in which case the operating system 70 may be omitted. One or more data structures 74 may also reside in memory 66, and may be used by the processor 64, operating system 70, or application 72 to store or manipulate data.

The controller 42 may control the various cycles of the fryer 10 by transmitting signals to, and receiving signals from the control panel 18, temperature sensors 48-50, level sensor 52, and power switches 55-58. For example, the controller 42 may control the temperature of the cooking medium 36 by applying power to the heating elements 44-47 in a controlled manner through selective activation of the corresponding power switches 55-58. This controlled application of power to a heating element may be referred to herein as simply activation of the heating element. The amount of power applied to the heating element while it is activated may be further controlled using Pulse-Width-Modulation (PWM) or any other suitable method of controlling the applied power.

The controller 42 may determine the sensed temperature $T_{SENSE}$ of the cooking medium 36 by averaging the temperatures detected by each of the temperature sensors 48-50. This sensed cooking medium temperature may be updated periodically, e.g., about once every 2.5 seconds. If the controller 42 determines the temperature of the cooking medium 36 has exceeded a maximum operating temperature $T_{MAX}$ (e.g., $T_{MAX}$=400° F.), the controller 42 may shut off power to all heating elements 44-47 and cause the control panel 18 to indicate an overtemperature alarm. As a further precaution, the thermal cutoff switch 54 may be configured to electrically decouple the power switches 55-58 from the power source 59 if the temperature of the cooking medium 36 rises above a high limit temperature $T_{HL}$ (e.g., $T_{HL}$=450° F.). In response to detecting the temperature of the cooking medium 36 has exceeded the high limit temperature $T_{HL}$, the controller 42 may cause the control panel 18 to indicate another type of overtemperature alarm.

Figure 3:
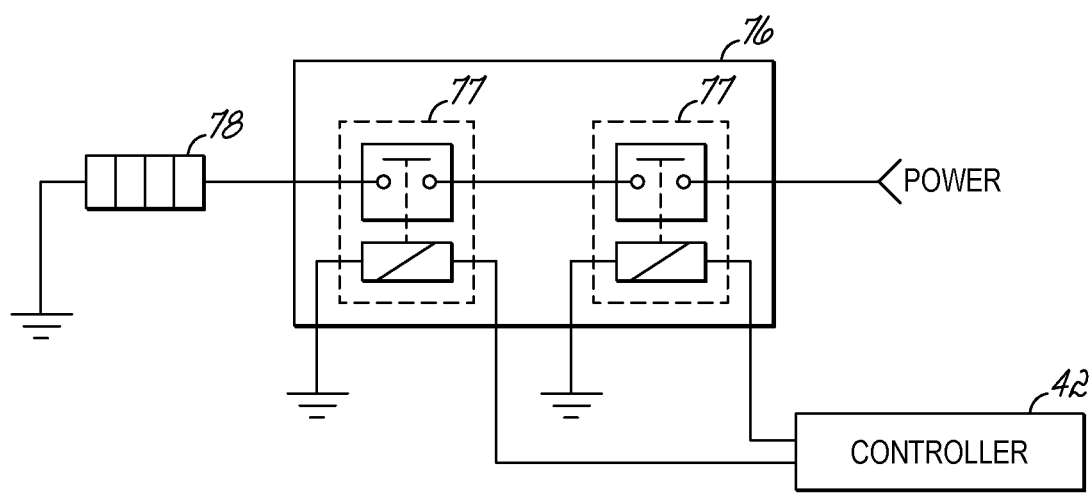
FIG. 3 is a diagrammatic view of an exemplary power switch of FIG. 2.

FIG. 3 depicts an exemplary power switch 76 in accordance with an embodiment of the invention. The power switch 76 includes a plurality of contactors 77 connected in series. The input of one of the contactors 77 is operatively coupled to a source of power (e.g., the output of thermal cutoff switch 54), and the output of the other contactor 77 is operatively coupled to a heating element 78. The series configuration of contactors 77 requires the controller 42 to switch on both contactors 77 in order to activate the heating element 78.

The controller 42 may disable the heating system 40 by default on power-up. Having a default startup in which the heating system 40 is inactive may facilitate maintenance and filtration activities, and may also prevent the heating elements 44-47 from running in off hours. In response to powering up the fryer 10, the control panel 18 may initially display a menu screen that provides the operator with the option of enabling the heating elements 44-47 in none, one, or both fry pots 12, 14. An overtemperature interlock feature programmed into the controller 42 may prevent the heating elements 44-47 from being activated if the temperature of the cooking medium 36 is too high, e.g., above 400° F. After the preliminary checks have been completed and the heating elements 44-47 are enabled, the heating system 40 is operational.

The heating system 40 attempts to maintain the temperature of the cooking medium 36 at the setpoint temperature $T_{SP}$ by automatically activating and deactivating the heating elements 44-47. When the heating system 40 is operating in the melt mode, the setpoint temperature $T_{SP}$ is set to a melt temperature $T_{MELT}$, e.g., about 215° F. When the heating system 40 is operating in the cooking mode, the setpoint temperature $T_{SP}$ is set to a target cooking temperature $T_{TCT}$, e.g., about 335° F. When the heating system 40 is operating in the warm idle mode, the setpoint temperature $T_{SP}$ is set to an idle temperature $T_{IDLE}$, e.g., about 275° F.

Figure 4:
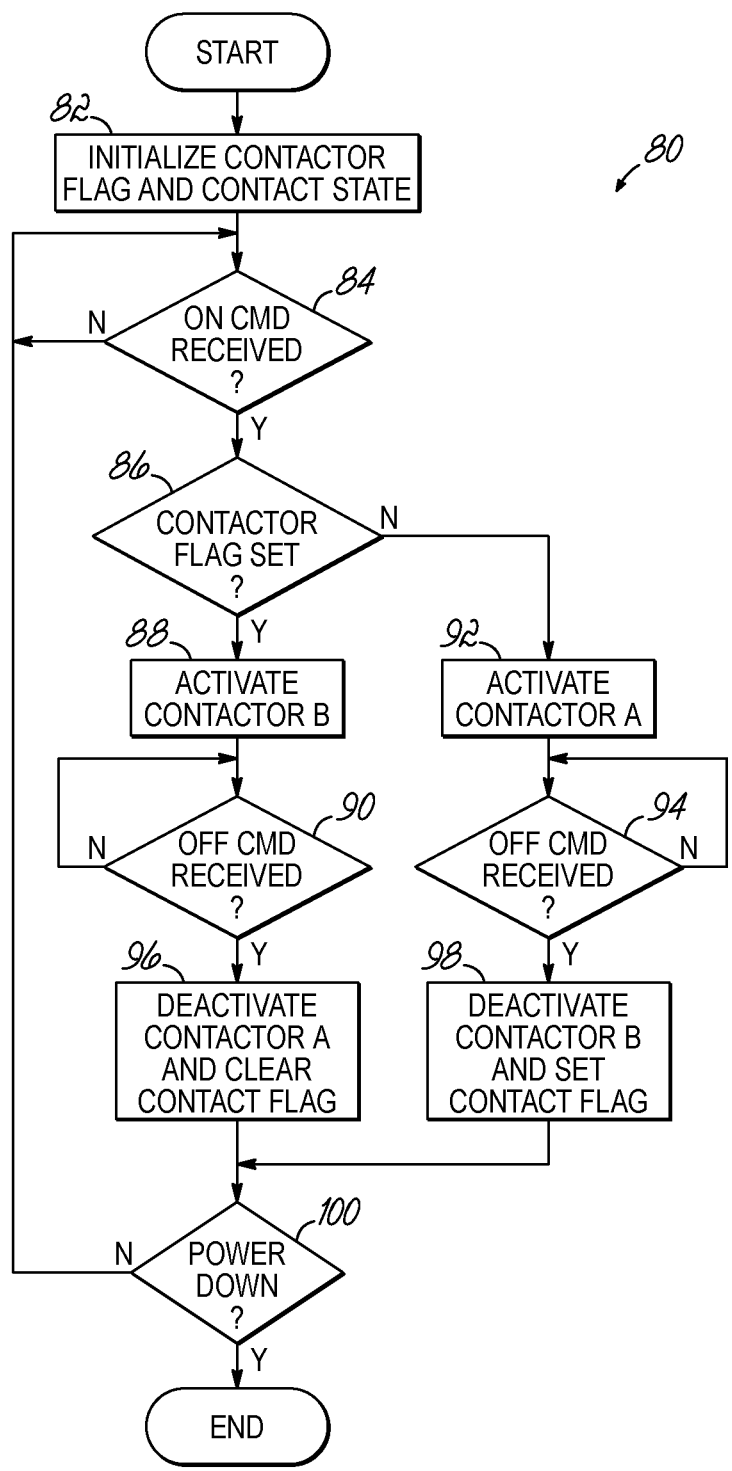
FIG. 4 is a flow chart of a heating element control process which may be executed by the controller of FIG. 2.

FIG. 4 depicts a flowchart illustrating an exemplary heating element control process 80 that may be implemented to control activation of individual heating elements 44-47 in accordance with an embodiment of the invention in which each power switch 55-58 includes two contactors 77, such as shown by the power switch 76 depicted in FIG. 3. Although shown as a single process for clarity, it should be understood that a separate instance of process 80 may be executed concurrently for each heating element 44-47. In block 82, the process 80 may initialize a contactor flag and a contactor state. This initialization may include causing one of the contactors 77 to enter a low impedance or "closed" state (e.g., contactor A), another contactor 77 to enter a high impedance or "open" state (e.g., contactor B), and the contactor flag for the switch being controlled to be set or cleared in accordance with the state of the contactors (e.g., contactor flag=set).

In block 82, the process 80 determines if an on-command has been received for the heating element, e.g., from a temperature control process being executed by the controller 42. If an on-command has not been received ("NO" branch of decision block 82), the process 80 may continue to wait for the on-command. If an on-command has been received ("YES" branch of decision block 82), the process 80 proceeds to block 86 and checks the status of the contactor flag. If the contactor flag is set ("YES" branch of decision block 86), the process 80 proceeds to block 88, activates (i.e., closes) contactor B, and proceeds to block 90. If the contactor flag is not set ("NO" branch of decision block 86), the process 80 proceeds to block 92, activates (i.e., close) contactor A, and proceeds to block 94.

In block 90 and in block 94, the process 80 determines if an off-command has been received, e.g., from the aforementioned temperature control process. If an off-command has not been received ("NO" branch of decision blocks 90, 94), the process 80 continues to wait for the off-command. If an off-command has been received ("YES" branch of decision blocks 90, 94), the process 80 proceeds to block 96 (from block 90) or to block 98 (from block 94).

In block 96, the process 80 deactivates (i.e., opens) contactor A and clears the contactor flag. In block 98, the process 80 deactivates (i.e., opens) contactor B and clears the contactor flag. In either case, the process 80 then proceeds to block 100. The process 80 may thereby cause the switch to be in an open state by alternately opening one of the contactors 77 in the switch depending on the state of the contactor flag. The process 80 may thereby optimize contactor life by alternating which contactor 77 is activated between activations of the heating element controlled by the switch.

The controller 42 may attempt to maintain the temperature of the cooking medium 36 at the setpoint temperature $T_{SP}$ by determining an error temperature $T_{ERR}$. The error temperature $T_{ERR}$ may be determined by taking the difference between the sensed temperature $T_{SENSE}$ and the setpoint temperature $T_{SP}$, e.g., $T_{ERR}=T_{SENSE}-T_{SP}$. The error temperature $T_{ERR}$ may then be used as an input to a temperature control algorithm (e.g., a proportional-integral-derivative algorithm) that outputs a correction signal. The temperature control algorithm may use the correction signal determine the value of a control variable associated with a rate at which energy is to be provided to one or more of the heating elements 44-47. Control variables may include, but are not limited to a Pulse-Width-Modulation (PWM) duty cycle, heating element activation time, number of heating elements activated, or any other variable that controls the rate at which heat is provided to the cooking medium 36.

Figure 5:
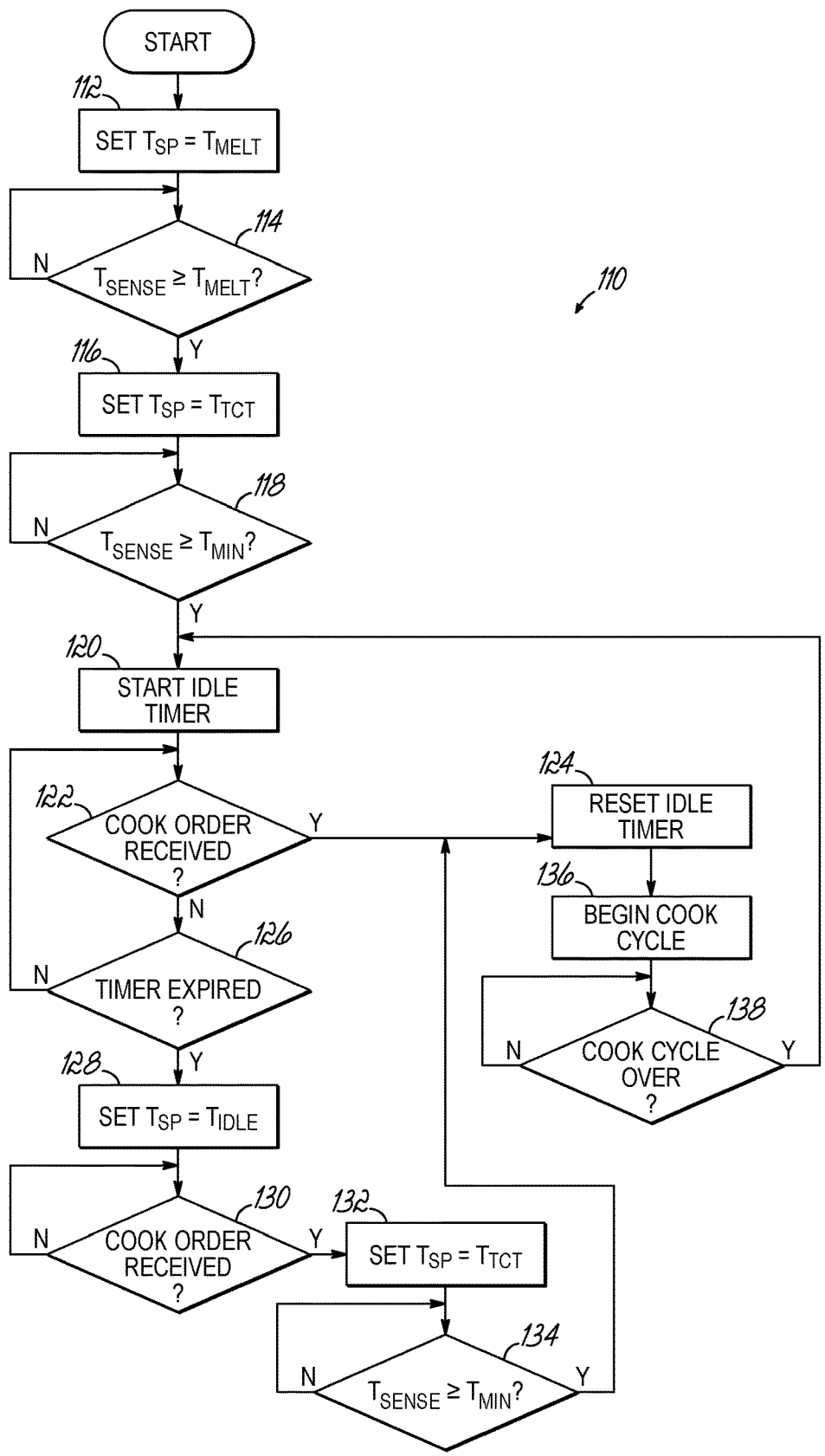
FIG. 5 is a flow chart of a temperature control process which may be executed by the controller of FIG. 2.

FIG. 5 depicts a flowchart illustrating a temperature control process 110 that may be implemented by the controller 42 to set the value of the setpoint temperature $T_{SP}$. In block 112, the process 110 sets the value of the setpoint temperature $T_{SP}$ to the melt temperature $T_{MELT}$, e.g., in response to the fryer 10 being powered on. The melt temperature $T_{MELT}$ may be selected to prevent the controller 42 from causing the heating elements 44-47 to heat up too fast from a cold startup. Setting the setpoint temperature $T_{SP}$ to the melt temperature $T_{MELT}$ may cause the heating system 40 to gradually heat cooking mediums which are solid at low temperature (e.g., shortening) so that the cooking medium 36 has an opportunity to liquefy before heat is applied at a higher rate. This may result in the cooking medium 36 being heated at a rate that prevents scorching, smoking, or breakdown of the cooking medium 36, as well as other negative effects.

In block 114, the process 110 may determine if the sensed temperature $T_{SENSE}$ of the cooking medium 36 has reached the melt temperature $T_{MELT}$. If the sensed temperature $T_{SENSE}$ of the cooking medium 36 has not reached the melt temperature $T_{MELT}$ ("NO" branch of decision block 114), the process 110 remains in the melt mode and continues to monitor the temperature of the cooking medium 36. If the sensed temperature $T_{SENSE}$ of the cooking medium 36 has reached the melt temperature $T_{MELT}$ ("YES" branch of decision block 114), the process 110 causes the fryer 10 to exit the melt mode and enter the cooking mode by proceeding to block 116, setting the value of the setpoint temperature $T_{SP}$ to the target cooking temperature $T_{TCT}$, and proceeding to block 118.

In block 118, the process 110 determines if the temperature of the cooking medium 36 is at or above a minimum cooking temperature $T_{MIN}$. The minimum cooking temperature $T_{MIN}$ is a temperature that is considered adequate to start a cook cycle, and may be equal to or somewhat below the target cooking temperature $T_{TCT}$. If the sensed temperature T SENSE of the cooking medium 36 is not at or above the minimum cooking temperature $T_{MIN}$ ("NO" branch of decision block 126), the process 110 continues to monitor the temperature of the cooking medium 36.

If the sensed temperature $T_{SENSE}$ of the cooking medium 36 has reached the minimum cooking temperature $T_{MIN}$. ("YES" branch of decision block 126), the process 110 proceeds to block 120, starts an idle timer, and proceeds to block 122. The idle timer may be a timer that defines how long the fryer 10 can be inactive before entering the warm idle mode. When the fryer 10 enters the warm idle mode, the temperature of the cooking medium is allowed to drop to the idle temperature $T_{IDLE}$. In an embodiment of the invention, the idle timer may be set so that the fryer 10 exits the cooking mode if no orders to cook a food product are received for five minutes.

In block 122, the process 110 determines if an order to cook a food product has been received, e.g., due to the operator selecting a cooking operation on the control panel 18 or because a cooking operation is waiting in a queue. If an order has been received ("YES" branch of decision block 120), the process 110 proceeds to block 124. If an order has not been received ("NO" branch of decision block 122), the process proceeds to block 126 and determines if the idle timer has expired. If the idle timer has not expired ("NO" branch of decision block 126), the process 110 returns to block 122. If the idle timer has expired ("YES" branch of decision block 126), the process 110 causes the fryer 10 to enter the warm idle mode by proceeding to block 128, setting the value of the setpoint temperature $T_{SP}$ to the warm idle temperature $T_{IDLE}$, and proceeding to block 130. The warm idle temperature $T_{IDLE}$ may be a temperature which is below typical cooking temperatures to avoid unnecessary aging of the cooking medium, but high enough to allow a short recovery time if the cooking medium 36 needs to be reheated to the target cooking temperature $T_{TCT}$.

While in the idle mode, the process 110 continues monitoring for reception of an order to cook a food product as described above with respect to block 122. If an order is not received ("NO" branch of decision block 130), the process 110 keeps the fryer 10 in the warm idle mode. If an order is received ("YES" branch of decision block 130), the process 110 causes the fryer 10 to exit the warm idle mode and enter the cooking mode by proceeding to block 132 and setting the setpoint temperature $T_{SP}$ to the target cooking temperature $T_{TCT}$.

In block 134, the process 110 determines if the temperature of the cooking medium 36 is at or above the minimum cooking temperature $T_{MIN}$. The temperature of the cooking medium 36 may have dropped below the minimum cooking temperature $T_{MIN}$, for example, if the fryer 10 has been in the idle mode long enough for the cooking medium to cool off significantly. If the sensed temperature $T_{SENSE}$ of the cooking medium 36 is not at or above the minimum cooking temperature $T_{MIN}$ ("NO" branch of decision block 134), the process 110 continues to monitor the temperature of the cooking medium 36 until it has reached the minimum cooking temperature $T_{MIN}$. In response to the sensed temperature $T_{SENSE}$ of the cooking medium 36 reaching the minimum cooking temperature $T_{MIN}$ ("YES" branch of decision block 126), the process 110 proceeds to block 124.

In block 124, the process 110 resets the idle timer and proceeds to block 136 to begin the cook cycle. The idle timer may be reset, for example, in response to detecting that a basket 38 has been lowered into the cooking medium 36. The controller 42 may detect a basket being lowered into the cooking medium 36, for example, based on a drop in the temperature of the cooking medium 36 sensed by one or more of the temperature sensors 48-50. During the cook cycle, the process 110 may proceed to block 138 and monitor the cook cycle to determine when the cook cycle is over, e.g., by monitoring a cook cycle timer. When the cook cycle is over ("YES" branch of decision block 138), the process 110 returns to block 120 and starts the idle timer. Thus, if another order to cook a food product is not received within the timeout period, the process 110 re-enters the warm idle mode as described above with respect to block 92 and block 94.

Figure 6:
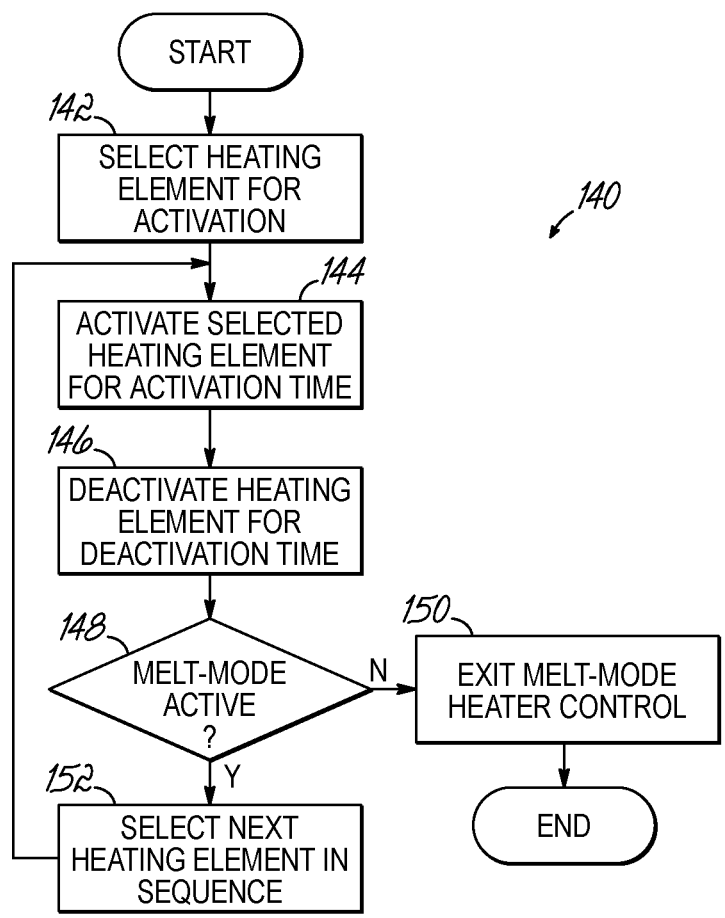
FIG. 6 is a flow chart of another heating element control process which may be executed by the controller of FIG. 2.

FIG. 6 depicts a flowchart illustrating a heating element control process 140 that may be implemented by the controller 42 to activate the heating elements 44-47 while the controller 42 is operating in the melt mode. Process 140 may cause the controller 42 to sequentially activate the heating elements 44-47 in a predetermined melt mode activation sequence.

In block 142, the process 140 selects a heating element 44-47 to activate that begins the activation sequence, e.g., top-left heating element 44. The process 140 then proceeds to block 144 and activates the selected heating element for a melt mode activation time $t_{mm\_on}$. In an embodiment of the invention, the melt mode activation time $t_{mm\_on}$ on may be about 15 seconds. The melt mode activation time $t_{mm\_on}$ on may vary depending on the type of cooking medium 36 in use. For example, cooking mediums 36 that are solid at room temperature (shortening) may have a shorter melt mode activation time $t_{mm\_on}$ on than cooking mediums 36 that are liquid at room temperature (e.g., vegetable oil).

When the melt mode activation time $t_{mm\_on}$ on has elapsed, the process 140 proceeds to block 146, deactivates the heating element, and waits for a melt mode deactivation time $t_{mm\_off}$ before proceeding to block 148. In an embodiment of the invention, the melt mode deactivation time $t_{mm\_off}$ may be about five seconds. The deactivation time $t_{mm\_off}$ may provide time for heat to dissipate into the cooking medium 36 as well as for the temperature sensors 48, 49, 50 to detect a change in the temperature of the cooking medium 36.

In block 148, the process 140 determines if the melt mode is still active, e.g., has the sensed temperature $T_{SENSE}$ reached the melt temperature $T_{MELT}$. If the melt mode is no longer active ("NO" branch of decision block 148), the process 140 proceeds to block 150 and exits melt mode heater control. If the melt mode is active ("YES" branch of decision block 148), the process 140 proceeds to block 152 and selects the next heating element 44-47 in the activation sequence, e.g., the bottom-right heating element 47. The process 140 then returns to block 144 and activates the newly selected heating element 44-47 for the activation time $t_{mm\_on}$. The heating element control process 140 may continue so long as the fryer 10 is in the melt mode so that the heating elements 44-47 are repeatedly powered according to the activation sequence. One suitable activation sequence that may be implemented for the configuration of heating elements 44-47 depicted in FIG. 2 is (1) top-left heating element 44, (2) bottom-right heating element 47, (3) bottom-left heating element 46, (4) top-right heating element 45. Whichever sequence used is repeated by the process 140 until the process 140 is terminated.

Figure 7:
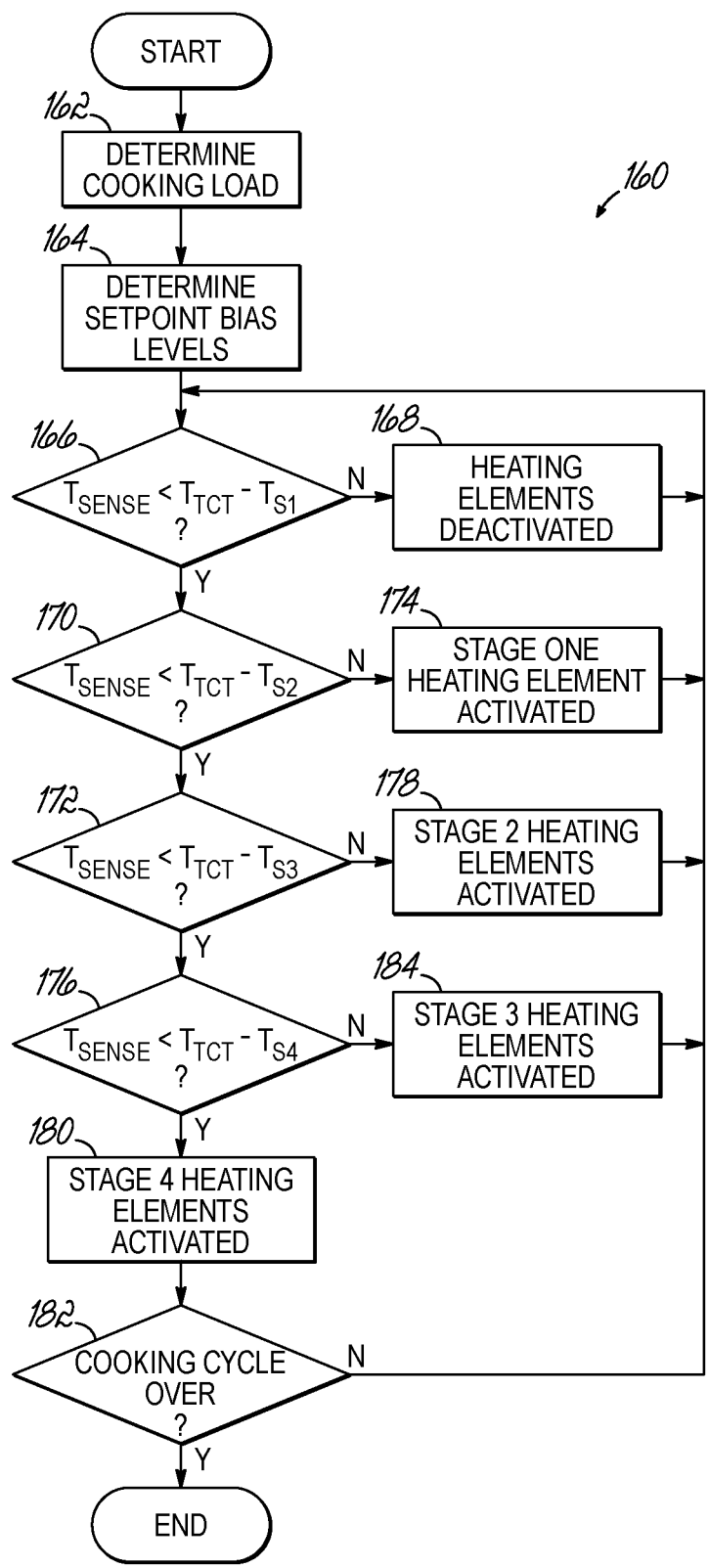
FIG. 7 is a flow chart of a heater staging process which may be executed by the controller of FIG. 2.

FIG. 7 depicts a flowchart illustrating a heater staging process 160 that may be implemented by the controller 42 to adjust the target cooking temperature $T_{TCT}$, and thus the setpoint temperature $T_{SP}$, when the fryer 10 is in the cooking mode. The process 160 may provide a heater-staged cooking feature that comprises a series of stages which determine which heating elements 44-47 are activated while the fryer 10 is operating in the cooking mode. The process 160 may be initiated by the controller 42 in response to beginning a cook cycle, or at any other suitable time.

In block 162, the process 160 determines a cooking load for the cook cycle. Exemplary cooking loads may include full baskets (e.g., two full baskets), part-full baskets (e.g., one full basket and one half-full basket), and half-full baskets (e.g., two half-full baskets). In response to determining the cooking load, the process 160 proceeds to block 164 and selects a set of setpoint bias temperatures based on the cooking load. Each setpoint bias temperature defines a threshold temperature level below the target cooking temperature $T_{TCT}$. When the sensed temperature $T_{SENSE}$ drops below one of the threshold temperatures, a different heater stage may be activated. For example, a stage one bias temperature $T_{S1}$ in the full baskets group may have one value (e.g., 2° F.), the stage one bias temperature $T_{S1}$ in the part-full baskets group may have another value (e.g., 3° F.), and so on. Exemplary setpoint bias temperatures are shown in Table I below.

TABLE 1

Setpoint Bias Temperatures

| Stage | Full Baskets | Part-Full Baskets | Half-Full Baskets |
|---|---|---|---|
| 1 | 2° F. | 3° F. | 3° F. |
| 2 | 3° F. | 4° F. | 5° F. |
| 3 | 4° F. | 6° F. | 8° F. |
| 4 | 5° F. | 10° F. | 15° F. |

Once the setpoint bias temperatures have been selected based on the cooking load, the process 160 proceeds to block 166 and determines if the sensed temperature $T_{SENSE}$ has dropped below the stage one threshold temperature $T_{TH1}$, i.e., is $T_{TCT} - T_{SENSE} > T_{S1}$? If the sensed temperature $T_{SENSE}$ has not dropped below the stage one threshold temperature $T_{TH1}$ ("NO" branch of decision block 166), the process 160 proceeds to block 168, deactivates any active heating elements, and continues to monitor the temperature of the cooking medium 36. If the sensed temperature $T_{SENSE}$ has dropped below the stage one threshold temperature $T_{TH1}$ ("YES" branch of decision block 166), the process 160 proceeds to block 170.

In block 170, the process 160 determines if the sensed temperature $T_{SENSE}$ has dropped below the stage two threshold temperature $T_{TH2}$. If the sensed temperature $T_{SENSE}$ has dropped below the stage two threshold temperature $T_{TH2}$ ("YES" branch of decision block 168), the process 160 proceeds to block 172. If the sensed temperature $T_{SENSE}$ has not dropped below the stage two threshold temperature $T_{TH2}$ ("NO" branch of decision block 168), the process 160 proceeds to block 174, activates the stage one heating element and returns to block 166. It should be understood that in process 160, "activating the stage 'X' heating element(s)" means that only the heating element or elements of that stage are active after activation. That is, activation of a particular stage will deactivate any heating elements which were previously active but that are not included in the particular stage.

To determine which heating element to activate in block 174, the process 160 may implement the cold-region selection feature. Under a stage one condition, the cold-region selection feature may select a heating element 44-47 on the side of the fry pot 12, 14 with the lowest temperature for activation. For example, if the left temperature sensor 48 indicates a lower temperature than the right temperature sensor 50, the process 160 may select one of the left-side heating elements (e.g., the top-left heating element 44) for activation. In contrast, if the right temperature sensor 50 indicates a lower temperature than the left temperature sensor 48, the process 160 may select one of the right-side heating elements (e.g., the top-right heating element 45) for activation.

In block 172, the process 160 determines if the sensed temperature $T_{SENSE}$ has dropped below the stage three threshold temperature $T_{TH3}$. If the sensed temperature $T_{SENSE}$ of the cooking medium 36 has dropped below the stage three threshold temperature $T_{TH3}$ ("YES" branch of decision block 172), the process 160 proceeds to block 176. If the sensed temperature $T_{SENSE}$ of the cooking medium 36 has not dropped below the stage three threshold temperature $T_{TH3}$ ("NO" branch of decision block 172), the process 160 proceeds to block 178, activates the stage two heating elements, and returns to block 166.

The stage two activation may either keep the heating element activated in stage one active, or if no heating elements are already active, select a heating element on the side of the fry pot 12, 14 with the lowest temperature for activation as described above for block 174. The process 160 may then activate another heating element by selecting an inactive heating element on the side of the fry pot 12, 14 with the lowest temperature for activation. This additional heating element may be on the same side as the heating element activated in stage one (e.g., both the top-left heating element 44 and the bottom-left heating element 46 are activated), or on the opposite side from the heating element activated in stage one (e.g., both the top-left heating element 44 and the top-right heating 45 are activated). The latter opposite-side scenario may be more common in cases where the process 160 has been in stage one for a period of time prior to entering stage two.

In block 176, the process 160 determines if the sensed temperature $T_{SENSE}$ of the cooking medium 36 has dropped below the stage four threshold temperature $T_{TH4}$. If the sensed temperature $T_{SENSE}$ of the cooking medium 36 has dropped below the stage four threshold temperature $T_{TH4}$ ("YES" branch of decision block 176), the process 160 proceeds to block 180, activates the stage four heating elements, and proceeds to block 182. The stage four activation may either activate or keep the heating elements activated in stages one through three active as described above, as well as activate another heating element, e.g., the only remaining inactive heating element of the heating system 40 depicted in FIG. 2.

If the sensed temperature $T_{SENSE}$ of the cooking medium 36 has not dropped below the stage four threshold temperature $T_{TH4}$ ("NO" branch of decision block 176), the process 160 proceeds to block 184, activates the stage three heating elements, and returns to block 136. The stage three activation may either activate or keep the heating elements activated in stages one and two active as described above, as well as activate another heating element. If all the heating elements on one side of the fry pot 12, 14 have been activated (e.g., both the top-left heating element 44 and bottom-left heating element 46 are activated), the process 160 selects a heating element from the other side for activation (e.g., the top-right heating element 45). If one heating element on each side of the fry pot 12, 14 has been activated (e.g., both the top-left heating element 44 and the top-right heating element 45 are activated), the process 160 may select a remaining heating element from the colder side for activation (e.g., one of the bottom-left heating element 46 or bottom-right heating element 47).

In block 182, the process 160 determines if the cook cycle has finished. If the cook cycle is has not finished ("NO" branch of decision block 184), the process 160 returns to block 136 and continues implementing staged heating control of the heating elements 44-47. If the cook cycle has finished ("YES" branch of decision block 184), the process 160 may terminate.

By selecting a heating element on the side of the fry pot 12, 14 with the lowest temperature for activation, the cold-region selection feature may provide more even heating of the cooking medium 36 as compared to heating systems lacking this feature. The cold-region selection feature may also help compensate for uneven cooking loads. This advantage extends to heating stages in which an additional heating element is being activated. The additional heating element may be on the same side as the heating element activated in stage one (e.g., both the top-left heating element 44 and the bottom-left heating element 46 are activated), or on the opposite side from the heating element activated in stage one (e.g., both the top-left heating element 44 and the top-right heating element 45 are activated) depending on the temperature distribution of the cooking medium 36.

As the temperature of the cooking medium 36 rises, the process 160 may reduce the number of active heating elements on the side of the fry pot 12, 14 where the cooking medium 36 has a higher temperature by default. That is, the activated heating elements may be deactivated in the reverse order they were activated as the temperature of the cooking medium 36 rises above each of the threshold temperatures. By preferentially activating heating elements 44-47 proximate to regions of the cooking medium 36 that are relatively colder than other regions or the average temperature of the cooking medium 36, the cold-region selection feature may reduce temperature gradients across the cooking medium 36.

The above process 160 may also include a staggered heating element activation scheme that introduces a delay $t_d$ between sequential activation of heating elements 44-47, e.g., a delay $t_d \geq 100$ milliseconds. This delay may increase the amount of time necessary to activate all the heating elements 44-47 from an initial state in which no heating elements are active. For example, for a 100 millisecond delay, it would take a minimum of 300 milliseconds to go from no active heating elements to four active heating elements.

Embodiments of the invention may also include a cooking medium filtration feature having different modes of operation. These modes may include a hands-free mode, an operator-initiated mode, and a service mode. The hands-free mode may cause a filtration cycle to run based on the number of cook cycles, e.g., the filtration cycle runs automatically when the number of cook cycles since the last filtration cycle or a change of cooking medium exceeds a threshold. The operator-initiated mode may cause the filtration cycle to run when the operator activates a filtration cycle using the control panel. This mode may only be run one time. The service mode (including oil dispose) may only run when the operator activates this mode using the control panel.

The hands-free filtration process operates without operator intervention. Before the filtration cycle begins, the fry pot 12, 14 containing the cooking medium 36 that is to be filtered may be prohibited from accepting any new cook cycles or auto-top off operations. A cook cycle that is in process may be allowed to complete, and any cook cycles in the queue for the fry pot 12, 14 being filtered may be automatically moved to the other fry pot 12, 14. The hands-free filtration process may then perform a circuit verification that confirms the drain pan switch is closed and that all heating elements are deactivated before starting the filtration cycle. If these two conditions are not met, the hands-free filtration process may delay or abort the filtration cycle.

The filtration cycle may start by opening the fill solenoid. After a delay (e.g., two seconds), the filter pump motor may be activated, thereby causing the cooking medium 36 to be agitated in the fry pot 12, 14. This agitation may cause crumbs to be disturbed and lifted into the cooking medium 36. Next, while the pump is still running, the hands-free filtration process opens the drain valve for a period based on a hands-free drain valve open time setting stored in memory. When the drain valve open time has expired, the hands-free filtration process closes the drain valve. The hands-free drain valve open time setting may be set to allow a pre-determined amount of oil to drain from the fry pot and into the drain pan. The duration of the hands-free drain valve open time necessary to allow the predetermined amount of cooking medium 36 to drain may be determined empirically, and may vary depending on the type and temperature of the cooking medium being drained.

The drained cooking medium 36 may then be filtered and returned to the fry pot 12, 14. To this end, the pump may be operated for a period of time based on a hands-free pump activation time that has been determined to be sufficient to return all the drained and filtered cooking medium 36 to the fry pot 12, 14. After the pump is stopped, the hands-free filter process may wait for a period of time (e.g., 2 seconds) before closing the fill solenoid valve and completing the process. When the filtration cycle is complete, any cook cycles still in the queue may be redistributed across both fry pots 12, 14, and the auto-top off feature reactivated.

Embodiments of the invention may also include a "proof of cooking medium" check feature. This feature may operate when the fryer 10 is initially powered up (e.g., during the program start-up sequence), and may also operate during one or more of the melt mode, a pre-heat mode, the warm idle mode, the cooking mode, as well as after a filtering or fill cycle. The proof of cooking medium feature verifies that the fry-pot being checked has a sufficient amount of cooking medium to operate safely, e.g., enough cooking medium 36 to cover the heating elements 44-47, temperature sensors 48-50, and thermal cutoff switch 54.

In general, the routines executed to implement the embodiments of the invention, whether implemented as part of an operating system or a specific application, component, program, object, module or sequence of instructions, or a subset thereof, may be referred to herein as "computer program code," or simply "program code." Program code typically comprises computer-readable instructions that are resident at various times in various memory and storage devices in a computer and that, when read and executed by one or more processors in a computer, cause that computer to perform the operations necessary to execute operations or elements embodying the various aspects of the embodiments of the invention. Computer-readable program instructions for carrying out operations of the embodiments of the invention may be, for example, assembly language, source code, or object code written in any combination of one or more programming languages.

Various program code described herein may be identified based upon the application within which it is implemented in specific embodiments of the invention. However, it should be appreciated that any particular program nomenclature which follows is used merely for convenience, and thus the invention should not be limited to use solely in any specific application identified or implied by such nomenclature. Furthermore, given the generally endless number of manners in which computer programs may be organized into routines, procedures, methods, modules, objects, and the like, as well as the various manners in which program functionality may be allocated among various software layers that are resident within a typical computer (e.g., operating systems, libraries, API's, applications, applets, etc.), it should be appreciated that the embodiments of the invention are not limited to the specific organization and allocation of program functionality described herein.

The program code embodied in any of the applications/modules described herein is capable of being individually or collectively distributed as a computer program product in a variety of different forms. In particular, the program code may be distributed using a computer-readable storage medium having computer-readable program instructions thereon for causing a processor to carry out aspects of the embodiments of the invention.

Computer-readable storage media, which is inherently non-transitory, may include volatile and non-volatile, and removable and non-removable tangible media implemented in any method or technology for storage of data, such as computer-readable instructions, data structures, program modules, or other data. Computer-readable storage media may further include RAM, ROM, erasable programmable read-only memory (EPROM), electrically erasable programmable read-only memory (EEPROM), flash memory or other solid state memory technology, portable compact disc read-only memory (CD-ROM), or other optical storage, magnetic cassettes, magnetic tape, magnetic disk storage or other magnetic storage devices, or any other medium that can be used to store data and which can be read by a computer. A computer-readable storage medium should not be construed as transitory signals per se (e.g., radio waves or other propagating electromagnetic waves, electromagnetic waves propagating through a transmission media such as a waveguide, or electrical signals transmitted through a wire). Computer-readable program instructions may be downloaded to a computer, another type of programmable data processing apparatus, or another device from a computer-readable storage medium or to an external computer or external storage device via a network.

Computer-readable program instructions stored in a computer-readable medium may be used to direct a computer, other types of programmable data processing apparatuses, or other devices to function in a particular manner, such that the instructions stored in the computer-readable medium produce an article of manufacture including instructions that implement the functions, acts, or operations specified in the flowcharts, sequence diagrams, or block diagrams. The computer program instructions may be provided to one or more processors of a general purpose computer, a special purpose computer, or other programmable data processing apparatus to produce a machine, such that the instructions, which execute via the one or more processors, cause a series of computations to be performed to implement the functions, acts, or operations specified in the flowcharts, sequence diagrams, or block diagrams.

The flowcharts and block diagrams depicted in the figures illustrate the architecture, functionality, or operation of possible implementations of systems, methods, or computer program products according to various embodiments of the invention. In this regard, each block in the flowchart or block diagrams may represent a module, segment, or portion of instructions, which comprises one or more executable instructions for implementing the specified logical function or functions.

In certain alternative embodiments, the functions, acts, or operations specified in the flowcharts, sequence diagrams, or block diagrams may be re-ordered, processed serially, or processed concurrently consistent with embodiments of the invention. Moreover, any of the flowcharts, sequence diagrams, or block diagrams may include more or fewer blocks than those illustrated consistent with embodiments of the invention. It should also be understood that each block of the block diagrams or flowcharts, or any combination of blocks in the block diagrams or flowcharts, may be implemented by a special purpose hardware-based system configured to perform the specified functions or acts, or carried out by a combination of special purpose hardware and computer instructions.

The terminology used herein is for the purpose of describing particular embodiments only and is not intended to be limiting of the embodiments of the invention. As used herein, the singular forms "a", "an" and "the" are intended to include both the singular and plural forms, and the terms "and" and "or" are each intended to include both alternative and conjunctive combinations, unless the context clearly indicates otherwise. It will be further understood that the terms "comprises" or "comprising," when used in this specification, specify the presence of stated features, integers, actions, steps, operations, elements, or components, but do not preclude the presence or addition of one or more other features, integers, actions, steps, operations, elements, components, or groups thereof. Furthermore, to the extent that the terms "includes", "having", "has", "with", "comprised of", or variants thereof are used in either the detailed description or the claims, such terms are intended to be inclusive in a manner similar to the term "comprising".

While all the invention has been illustrated by a description of various embodiments, and while these embodiments have been described in considerable detail, it is not the intention of the Applicant to restrict or in any way limit the scope of the appended claims to such detail. Additional advantages and modifications will readily appear to those skilled in the art. The invention in its broader aspects is therefore not limited to the specific details, representative apparatus and method, and illustrative examples shown and described. Accordingly, departures may be made from such details without departing from the spirit or scope of the Applicant's general inventive concept.

What is claimed is:

1. A fryer comprising:
   a fry pot configured to receive a cooking medium;
   a heating element configured to heat the cooking medium;
   a controller; and
   a power switch including a first contactor and a second contactor connected in series, the power switch being configured to selectively couple the heating element to a power source in response to one or more signals from the controller,
   wherein the controller is configured to:
   control an amount of heat provided to the cooking medium based on a setpoint temperature, the setpoint temperature being set to a target cooking temperature during a cook cycle;
   in response to receiving a first command to activate the heating element, determine a state of a contactor flag having a first state indicating that the first contactor is open and a second state indicating the second contactor is open;
   in response to the contactor flag being in the first state:
     close the first contactor, and
     in response to receiving a second command to deactivate the heating element, open the second contactor and change the state of the contactor flag to the second state; and
   in response to the contactor flag being in the second state:
     close the second contactor, and
     in response to receiving the second command to deactivate the heating element, open the first contactor and change the state of the contactor flag to the first state.

2. The fryer of claim 1, wherein the controller is further configured to:
   in response to the cook cycle ending, start an idle timer;
   if an order to cook is received prior to expiration of the idle timer, reset the idle timer; and
   if the order to cook is not received prior to expiration of the idle timer, set the setpoint temperature to an idle temperature that is less than the target cooking temperature.

3. The fryer of claim 2 wherein the controller is further configured to:
   in response to the fryer being powered on, set the setpoint temperature to a melt temperature that is less than the idle temperature; and
   in response to a sensed temperature of the cooking medium reaching the melt temperature, set the setpoint temperature to the target cooking temperature.

4. The fryer of claim 3 wherein the heating element is one of a plurality of heating elements, and the controller is further configured to, while the setpoint temperature is set to the melt temperature:
   select a heating element of the plurality of heating elements based on an activation sequence;

activate the selected heating element for an activation time;

in response to the activation time expiring, deactivate the selected heating element;

select a next heating element in the activation sequence; and repeat activation, deactivation, and selection of the next heating element in the activation sequence while the setpoint temperature is set to the melt temperature.

5. The fryer of claim 4 wherein the controller is further configured to, in response to deactivating the selected heating element, wait for a deactivation time before activating the next heating element.

6. The fryer of claim 4 wherein:

the fry pot includes a plurality of regions, each heating element of the plurality of heating elements is located in one of the plurality of regions, and the activation sequence is configured so that consecutively activated heating elements are not in the same region.

7. The fryer of claim 1, wherein the heating element is one of a plurality of heating elements each configured to provide heat to the cooking medium in response to being activated by the controller, and the controller is further configured to:

determine an anticipated cooking load based at least in part on an amount of a food product to be cooked;

select a set of setpoint bias temperatures based on the anticipated cooking load, each setpoint bias temperature defining a threshold temperature below the target cooking temperature;

in response to a sensed temperature of the cooking medium being below a first threshold temperature but above a second threshold temperature, activate a first heating element of the plurality of heating elements; and in response to the sensed temperature of the cooking medium being below the second threshold temperature, activate a second heating element of the plurality of heating elements.

8. A method of controlling a fryer that includes a heating element and a power switch including a first contactor and a second contactor connected in series, the power switch being configured to selectively couple the heating element to a power source, the method comprising:

controlling an amount of heat provided to a cooking medium based on a setpoint temperature, the setpoint temperature being set to a target cooking temperature during a cook cycle;

in response to receiving a first command to activate the heating element, determining a state of a contactor flag having a first state indicating that the first contactor is open and a second state indicating the second contactor is open;

in response to the contactor flag being in the first state:

closing the first contactor of the power switch, and in response to receiving a second command to deactivate the heating element, opening the second contactor and changing the state of the contactor flag to the second state; and in response to the contactor flag being in the second state:

closing the second contactor, and in response to receiving the second command to deactivate the heating element, opening the first contactor and changing the state of the contactor flag to the first state.

9. The method of claim 8, further comprising:

in response to the cook cycle ending, starting an idle timer;

if an order to cook is received prior to expiration of the idle timer, resetting the idle timer; and if the order to cook is not received prior to expiration of the idle timer, setting the setpoint temperature to an idle temperature that is less than the target cooking temperature.

10. The method of claim 9 further comprising:

in response to the fryer being powered on, setting the setpoint temperature to a melt temperature that is less than the idle temperature; and in response to a sensed temperature of the cooking medium reaching the melt temperature, setting the setpoint temperature to the target cooking temperature.

11. The method of claim 10 further comprising:

while the setpoint temperature is set to the melt temperature:

selecting a heating element of a plurality of heating elements based on an activation sequence;

activating the selected heating element for an activation time;

in response to the activation time expiring, deactivating the selected heating element;

selecting a next heating element in the activation sequence; and repeating activation, deactivation, and selection of the next heating element in the activation sequence while the setpoint temperature is set to the melt temperature.

12. The method of claim 11 further comprising:

in response to deactivating the selected heating element, waiting for a deactivation time before activating the next heating element.

13. The method of claim 11 wherein:

each heating element of the plurality of heating elements is located in one of a plurality of regions of a fry pot, and the activation sequence is configured so that consecutively activated heating elements are not in the same region.

* * * * *